(12) United States Patent
Cobb et al.

(10) Patent No.: US 7,904,451 B2
(45) Date of Patent: Mar. 8, 2011

(54) RHETORICAL CONTENT MANAGEMENT WITH TONE AND AUDIENCE PROFILES

(75) Inventors: John Neil Cobb, Plano, TX (US); Yeow Loong Lee, St. Louis, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 344 days.

(21) Appl. No.: 11/867,526

(22) Filed: Oct. 4, 2007

(65) Prior Publication Data

US 2008/0027978 A1  Jan. 31, 2008

Related U.S. Application Data

(63) Continuation of application No. 10/806,047, filed on Mar. 22, 2004, now Pat. No. 7,296,027.

(51) Int. Cl.
*G06F 17/30* (2006.01)

(52) U.S. Cl. ......... 707/730; 707/749; 707/750; 715/234; 704/9

(58) Field of Classification Search .................. 707/100, 707/101, 695, 722, 730, 749; 715/234; 704/9
See application file for complete search history.

(56) References Cited

U.S. PATENT DOCUMENTS

| | | | |
|---|---|---|---|
| 5,369,573 A * | 11/1994 | Holloran et al. ............ 715/234 |
| 5,459,827 A | 10/1995 | Allouche et al. | |
| 5,537,586 A | 7/1996 | Amram et al. | |
| 5,819,260 A | 10/1998 | Lu et al. | |
| 5,822,539 A | 10/1998 | van Hoff | |
| 5,933,822 A | 8/1999 | Braden-Harder et al. | |
| 5,974,413 A | 10/1999 | Beauregard et al. | |
| 6,026,388 A | 2/2000 | Liddy et al. | |
| 6,038,573 A | 3/2000 | Parks | |
| 6,041,303 A * | 3/2000 | Mathews ........................ 705/1.1 |
| 6,112,168 A | 8/2000 | Corston et al. | |
| 6,182,029 B1 | 1/2001 | Friedman | |
| 6,185,587 B1 | 2/2001 | Bernardo et al. | |
| 6,199,034 B1 | 3/2001 | Wical | |
| 6,230,173 B1 | 5/2001 | Ferrel et al. | |
| 6,263,336 B1 | 7/2001 | Tanaka | |
| 6,295,529 B1 | 9/2001 | Corston-Oliver et al. | |
| 6,349,316 B2 | 2/2002 | Fein et al. | |
| 6,353,824 B1 | 3/2002 | Boguraev et al. | |
| 6,374,271 B1 | 4/2002 | Shimizu et al. | |
| 6,385,600 B1 | 5/2002 | McGuinness et al. | |
| 6,397,212 B1 | 5/2002 | Biffar | |
| 6,397,219 B2 | 5/2002 | Mills | |

(Continued)

OTHER PUBLICATIONS

Nick Nicholas, Parameters for Rhetorical Structure Theory Ontology, 1994, 1-17.*

(Continued)

*Primary Examiner* — John R. Cottingham
*Assistant Examiner* — Sherief Badawi
(74) *Attorney, Agent, or Firm* — Toler Law Group

(57) ABSTRACT

A content management system including an audience profile is disclosed. The content management system includes a database having a plurality of records. At least one record of the plurality of records includes a plurality of fields storing a plurality of grammatical syntax elements associated with a content subject. Each of the plurality of grammatical syntax elements has a rhetorical structure to facilitate selective assembly into at least one sentence. The content management system also includes an audience profile stored in a memory, the audience profile including a plurality of audience factors related to desired presentation of the content subject.

14 Claims, 11 Drawing Sheets

U.S. PATENT DOCUMENTS

| | | | |
|---|---|---|---|
| 6,434,547 B1 | 8/2002 | Mishelevich et al. | |
| 6,438,545 B1 | 8/2002 | Beauregard et al. | |
| 6,453,302 B1 * | 9/2002 | Johnson et al. | 705/27 |
| 6,457,002 B1 | 9/2002 | Beattie et al. | |
| 6,466,940 B1 | 10/2002 | Mills | |
| 6,484,177 B1 | 11/2002 | Van Huben et al. | |
| 6,505,160 B1 | 1/2003 | Levy et al. | |
| 6,509,910 B1 | 1/2003 | Agarwal et al. | |
| 6,513,063 B1 | 1/2003 | Julia et al. | |
| 6,516,337 B1 | 2/2003 | Tripp et al. | |
| 6,519,617 B1 | 2/2003 | Wanderski et al. | |
| 6,523,061 B1 | 2/2003 | Halverson et al. | |
| 6,549,612 B2 | 4/2003 | Gifford et al. | |
| 6,549,922 B1 | 4/2003 | Srivastava et al. | |
| 6,553,373 B2 | 4/2003 | Boguraev et al. | |
| 6,574,660 B1 | 6/2003 | Pashupathy et al. | |
| 6,625,258 B1 | 9/2003 | Ram et al. | |
| 6,629,097 B1 | 9/2003 | Keith | |
| 6,636,831 B1 | 10/2003 | Profit, Jr. et al. | |
| 6,643,652 B2 | 11/2003 | Helgeson et al. | |
| 6,647,396 B2 * | 11/2003 | Parnell et al. | 1/1 |
| 6,654,722 B1 | 11/2003 | Aldous et al. | |
| 6,654,747 B1 | 11/2003 | Van Huben et al. | |
| 6,658,414 B2 | 12/2003 | Bryan et al. | |
| 6,675,159 B1 | 1/2004 | Lin et al. | |
| 6,704,396 B2 | 3/2004 | Parolkar et al. | |
| 6,714,992 B1 | 3/2004 | Kanojia et al. | |
| 6,718,371 B1 | 4/2004 | Lowry et al. | |
| 6,721,727 B2 | 4/2004 | Chau et al. | |
| 6,721,747 B2 | 4/2004 | Lipkin | |
| 6,732,090 B2 | 5/2004 | Shanahan et al. | |
| 6,745,161 B1 | 6/2004 | Arnold et al. | |
| 6,778,979 B2 | 8/2004 | Grefenstette et al. | |
| 6,901,402 B1 | 5/2005 | Corston-Oliver et al. | |
| 6,957,229 B1 * | 10/2005 | Dyor | 1/1 |
| 6,983,288 B1 | 1/2006 | Kirkwood et al. | |
| 7,013,259 B1 | 3/2006 | Polanyi et al. | |
| 7,092,974 B2 | 8/2006 | Thomas et al. | |
| 7,113,943 B2 * | 9/2006 | Bradford et al. | 707/739 |
| 7,133,862 B2 | 11/2006 | Hubert et al. | |
| 7,171,361 B2 * | 1/2007 | Thomas et al. | 704/251 |
| 7,266,553 B1 | 9/2007 | Anderson et al. | |
| 7,284,191 B2 | 10/2007 | Grefenstette et al. | |
| 7,284,239 B1 | 10/2007 | Young et al. | |
| 7,296,027 B2 * | 11/2007 | Cobb et al. | 707/100 |
| 7,313,562 B2 * | 12/2007 | Cobb et al. | 707/102 |
| 7,334,216 B2 | 2/2008 | Molina-Moreno et al. | |
| 7,739,279 B2 * | 6/2010 | Van Den Berg et al. | 707/730 |
| 2002/0032709 A1 | 3/2002 | Gessner | |
| 2002/0095411 A1 | 7/2002 | Caldwell et al. | |
| 2002/0102524 A1 | 8/2002 | Rizzi et al. | |
| 2002/0107776 A1 | 8/2002 | Bove et al. | |
| 2002/0146015 A1 | 10/2002 | Bryan et al. | |
| 2002/0169604 A1 | 11/2002 | Damiba et al. | |
| 2002/0169605 A1 | 11/2002 | Damiba et al. | |
| 2002/0169611 A1 | 11/2002 | Guerra et al. | |
| 2003/0033288 A1 | 2/2003 | Shanahan et al. | |
| 2003/0065533 A1 | 4/2003 | Scheinkman | |
| 2003/0088421 A1 | 5/2003 | Maes et al. | |
| 2003/0115353 A1 | 6/2003 | Deryugin et al. | |
| 2003/0126136 A1 | 7/2003 | Omoigui | |
| 2004/0015408 A1 | 1/2004 | Rauen et al. | |
| 2004/0019638 A1 | 1/2004 | Makagon et al. | |
| 2004/0034520 A1 | 2/2004 | Langkilde-Geary et al. | |
| 2004/0095376 A1 * | 5/2004 | Graham et al. | 345/716 |
| 2005/0033750 A1 | 2/2005 | Cobb et al. | |
| 2005/0193335 A1 | 9/2005 | Dorai et al. | |
| 2006/0235738 A1 | 10/2006 | Doyle et al. | |
| 2006/0271578 A1 | 11/2006 | Cobb et al. | |
| 2007/0028166 A1 | 2/2007 | Hundhausen et al. | |
| 2007/0033207 A1 | 2/2007 | Cobb et al. | |
| 2007/0055682 A1 | 3/2007 | Cobb et al. | |
| 2007/0067371 A1 | 3/2007 | Allan et al. | |

OTHER PUBLICATIONS

Thompson et al, Rhetorical Structure Theory: A Framework for the Analysis of Texts, 1987, 1-27.*

Taboaba et al, Applications of Rhetorical Structure Theory, Jul. 22, 2005, 1-22.*

Colineau et al, The Delivery of Multimedia Presentations in a Graphical User Interface Environment, Feb. 1, 2006, 1-3.*

Keith Vander Linden et al., Expressing Rhetorical Relations in Instructional Text: A case Study of the purpose relation, Mar. 1995, MIT Press, vol. 21, Issue 1, pp. 29-57.

Non-Final Office Action for U.S. Appl. No. 11/595,099 mail date Apr. 30, 2007, 8 pp.

Non-Final Office Action for U.S. Appl. No. 11/498,219 mail date Mar. 4, 2009, 18 pp.

Non-Final Office Action for U.S. Appl. No. 11/500,683 mail date Jul. 24, 2008, 17 pp.

Non-Final Office Action for U.S. Appl. No. 11/500,683 mail date Jun. 8, 2009, 25 pp.

Final Office Action for U.S. Appl. No. 11/500,683 mail date Dec. 28, 2009, 22 pp.

Non-Final Office Action for U.S. Appl. No. 10/806,047 mail date Sep. 22, 2006, 8 pp.

Non-Final Office Action for U.S. Appl. No. 10/806,047 mail date Jan. 30, 2007, 8 pp.

Non-Final Office Action for U.S. Appl. No. 10/806,047 mail date Apr. 30, 2007, 9 pp.

* cited by examiner

Technical XML Structure (Code)
```
<?xml version="1.0" encoding="iso-8859-1".?>
<Product_Profile>
   <Product id="1">
      <Region>
         <PAC>
            <Product_Name>DSL Internet</Product_Name>
            <Expanded_Product_Name>Digital Subscriber Line (DSL)
               Internet</Expanded_Product_Name>
            <Updated_Date>2002-01-24</Updated_Date>
            <Updated_Time>13:54:00</Updated_Time>
            <Description>
               <Classical_Def>
602 ───── <Class_Description>high speed, point-to-point digital
                  connection </Class_Description>
604 ───── <Product_Description>uses regular telephone lines to
                  simultaneously transmit voice and
                  data.</Product_Description>
606 ───── <Comp_Old_New>DSL Internet allows you to connect to the
                  Internet at speeds 50 to 200 times faster than a 28.8
                  kbps modem.</Comp_Old_New>
               </Classical_Def>
```

Layout in XSLT
SBC Pacific Bell <Expanded Product Name> is a <Class Description> that <Product Description>. <Comp Old New>

Actual Output
SBC Pacific Bell Digital Subscriber Line (DSL) Internet is a high speed, point-to-point digital connection that uses regular telephone lines to simultaneously transmit voice and data. DSL Internet allows you to connect to the Internet at speeds 50 to 200 times faster than a 28.8 kbps modem.

*FIG. 6*

XML Structure

Managerial Content - Content Delivery Networking

```
<Classical_Def>
    <Product_Verb>is</Product_Verb>
    <Product_Article>a</Product_Article)
    <Class_Description>combination of equipment and
        managed network services</Class_Description>
    <Product_Relative Pronoun> that </Product_Relative Pronoun>
    <Product_Description> greatly improves the performance of
        content - rich network applications such as web-portal
or          video applications</Product_Description>
    <Comp_Old_New>Content Delivery Networking
(CDN) accelerates content delivery to provide maximum
        availability .
(CDN) provides the intelligence necessary to efficiently
        manage and distribute that content.</Comp_Old_New>
    <Teaser_Grabber>Looking for more efficient content
management?<Teaser_Grabber>
    <Diffs>CDN adds a layer  of intelligence to your IP
        infrastructure to help optimize web site performance,
            deliver  content efficiently, ensure content
availability and      security, and scale web sites and content-
delivery systems.         </Diffs>
    <Diffs>CDN equipment intelligently determines how to best
        serve a user's content request. <Diffs>
    <HowDoes>
        <Product_HowDoes>CDN  pre-populates frequently-
            accessed content--traditionally stored and
served                      from a central location--at various
branch                         locations.</Product_HowDoes>
        <Product_HowDoesExp> When a user at one of the
            branch locations requests that content, CDN
                equipment determines the best-site--
based upon user          location and site and network loads--
to send that                       content, and checks to see if
the local version of that              content is the most
current version. If not, CDN                       equipment
refreshes the content. If the local version              is
current, then the content is delivered to the user
        from the local system. </Product_HowDoesExp>
    </HowDoes>
</Classical_Def>
```

*FIG. 7*

```
XML Structure
Technical Content - Content Delivery Networking
<Classical_Def>
    <Product_Verb>is</Product_Verb>
    <Product_Article>a</Product_Article)
    <Class_Description>packaging of Cisco's CSS 11150
            content services switch with network management
                services</Class_Description>
    <Product_Relative_Pronoun> that </Product_Relative Pronoun>
    <Product_Description> enables ASPs, Web content
            providers, and e-commerce enterprises to optimize the
                performance of Web-portal or streaming media
                    applications while ensuring the security and
reliability of                 their network</Product_Description>
    <Comp_Old_New>Content Delivery Networking
(CDN) accelerates content delivery, overcoming latency
            and excessive bandwidth consumption issues inherent
                with previous networking solutions</
Comp_Old_New>
    <Teaser_Grabber>Optimize your e-commerce transactions
            and content-rich applications<Teaser_Grabber>
    <Diffs>CDN supports your e-Business endeavors in three
            areas: application acceleration, filtering and access
                control to Intranet, Extranet, and Internet content,
and            business video.<Diffs>
    <Diffs>Running on the Cisco Css 11150, Cisco Web NS
            Software intelligently determines how to best serve a
                user's content request. The CSS 11150 supports
wire-            speed flow forwarding between a client and Web
server,             based on the requested content's full URL, as
well as user            cookie and extensive resource
verification                  information<Diffs>
    <HowDoes>
        <Product_HowDoes>CDN equipment learns where
            specific content resides, either locally or remotely,
                and dynamically selects the best Web server or
                    cache for specific content requests
                        (LDAP).<Product_HowDoes>
        <Product_HowDoesExp> In a distributed Web site, the
            CDN switch performs comprehensive resource
                verification before routing user requests,
ensuring            they are directed to the location that
has the best            response time and the least load
for the requested            content. Local server
selection is based on server            load and application
response time, as well as            traditional least
connections and round-robin            algorithms.
Global server load balancing is based on
    Domain Name System (DNS) and proximity by
            source IP address. Any application that uses
                standard Transmission Control Protocol (TCP)
or            User Datagram Protocol (UDP) protocols can
also be            load-balanced including firewalls, mail, news,
chat,            and lightweight directory access protocol.
        </Product_HowDoesExp>
    </HowDoes>
</Classical_Def>
```

*FIG. 8*

Actual Output

| Managerial Content |
|---|
| Looking for more efficient content management? |
| Content Delivery Networking is a combination of equipment and managed network services that greatly improves the performance of content-rich network applications such as web-portal or video applications. Content Delivery Networking (CDN) accelerates content delivery to provide maximum availability. CDN provides the intelligence necessary to efficiently manage and distribute that content. |
| CDN adds a layer of intelligence to your IP infrastructure to help optimize web site performance, deliver content efficiently, ensure content availability and security, and scale web sites and content-delivery systems. |
| CDN equipment intelligently determines how to best serve a uer's content request. |
| CDN pre-populates frequently-accessed content--traditionally stored and served from a central location--at various branch locations. |
| When a user at one of the branch locations requests that content, CDN equipment determines the best site--based upon user location and site and network loads--to send that content, and checks to see if the local version of that content is the most current version. If not, CDN equipment refreshes the content. If the local version is current, then the contents is delivered to the user from the local system. |

*FIG. 9*

Actual Output

| Technical Content |
|---|
| Optimize your e-commerce transactions and content-rich applications.<br><br>Content Delivery Networking is a packaging of Cisco's CSS 11150 content services switch with SBC's network management services that enables ASPs, Web content providers, and e-commerce enterprises to optimize the performance of Web-portal or streaming media applications while ensuring the security and reliability of their network. Content Delivery Networking (CDN) accelerates content delivery, overcoming latency and excessive bandwidth consumption issues inherent with previous networking solutions.<br><br>CDN supports your e-Business endeavors in three areas: application acceleration, filtering and access control to Intranet, Extranet, and Internet content, and business video.<br><br>Running on the Cisco CSS 11150, Cisco Web NS Software intelligently determines how to best server a user's content request. The CSS 11150 supports wire-speed flow forwarding between a client and Web server, based on the requested content's full URL, as well as user cookie and extensive resource verification information.<br><br>CDN equipment learns where specific content resides, either locally of remotely, and dynamically selects the best Web server or cache for specific content requests (LDAP). In a distributed Web site, the CDN switch performs comprehensive resource verification before routing user requests, ensuring they are directed to the location that has the best response time and the least load for the requested content. Local server selection is based on server load and application response time, as well as traditional least connections and round-robin algorithms. Global server load balancing is based on Domain Name System (DNS) and proximity source IP address. Any application that uses standard Transmission Control Protocol (TCP) or User Datagram Protocol (UDP) protocols can also be load-balanced including firewalls, mail, news, chat and lightweight directory access protocol. |

*FIG. 10*

RHETORICAL CONTENT MANAGEMENT WITH TONE AND AUDIENCE PROFILES

CLAIM OF PRIORITY

The present application claims priority from and is a continuation of "RHETORICAL CONTENT MANAGEMENT WITH TONE AND AUDIENCE PROFILES", U.S. patent application Ser. No. 10/806,047, filed Mar. 22, 2004, whose contents are hereby incorporated by reference herein, which was a continuation-in-part of "RHETORICAL CONTENT MANAGEMENT SYSTEM AND METHODS", U.S. patent application Ser. No. 10/635,419, filed Aug. 6, 2003, whose contents are hereby incorporated by reference herein.

FIELD OF THE DISCLOSURE

The present application relates generally to rhetorical content management with tone control and audience profiles.

BACKGROUND

Content management is useful for providing a consistent image through various content delivery methods. For example, content management may be useful in providing a consistent product description across multiple sales and marketing mediums such as websites, proposals, brochures, and other documents.

However, content management becomes a significant problem for large organizations having multiple products or product lines. A large amount of content is provided to a large number of users. These problems may be further exacerbated by variances in regional availability, market targeting, and the greater demand for content through large sales channels. Delivery of suitable content is often slow.

In addition, content creation is a significantly expensive process. Initial creation is expensive. After initial content creation, the content may not be suitable for various purposes. As such, expenses increase as content is manually adapted for various uses.

Some organizations rely on multiple content management systems. Each system is managed by a different section. As such, content is created more than once and varies between sections. Therefore, it is difficult to create content that is consistent and accurate.

For large entities with extensive product lines, content management becomes a large and expensive process. As such, an improved content management system would be desirable.

BRIEF DESCRIPTION OF THE DRAWINGS

FIG. 6 depicts an exemplary rhetorical data structure.

FIG. 7-8 illustrate an XML structure.

FIGS. 9-10 illustrate an output document.

DETAILED DESCRIPTION OF THE DRAWINGS

A content management system including an audience profile is disclosed. The content management system includes a database having a plurality of records. At least one record of the plurality of records includes a plurality of fields storing a plurality of grammatical syntax elements associated with a content subject. Each of the plurality of grammatical syntax elements has a rhetorical structure to facilitate selective assembly into at least one sentence. The content management system also includes a server responsive to the database and an audience profile relating to a desired presentation of the content subject. The server is configured to selectively retrieve at least one grammatical syntax element of the plurality of grammatical syntax elements and to provide a data file including at least one grammatical syntax element. At least a portion of the data file is constructed based upon the audience profile.

Figure 1:
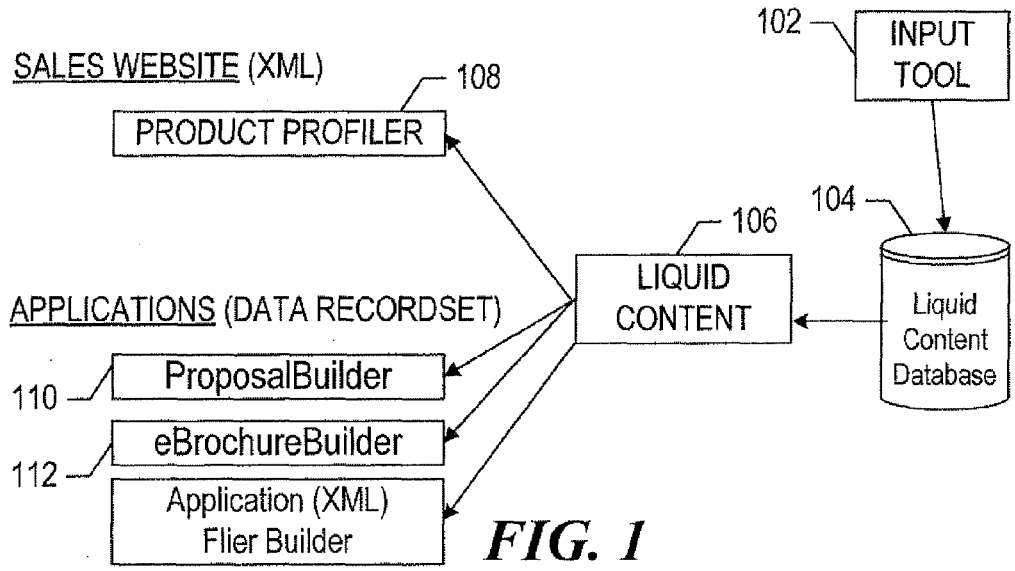
FIG. 1 depicts an exemplary embodiment of a content management system.

FIG. 1 depicts an exemplary embodiment of a content management system. The content management system includes a content database 104 and a content server 106. In addition, the content management system includes an input tool 102 and various applications 108, 110 and 112.

The input tool 102 is used to gather content segments and store those segments in a database 104. The content segments may, for example, be sentence fragments, phrases, nouns, sentences, and paragraphs. In one exemplary embodiment, sentence fragments are entered, following a specific grammatical format that fulfills a specified rhetorical purpose. Using the rhetorical format, parts of a sentence may be gathered, stored and associated as fields in the content database 104. Rhetorical principles control the development of the syntax from the grammatical elements and drive the deployment of the content to the application based on the communication function that the write wants to achieve.

The database 104 may be a database such as an Oracle® or SQL database. The database 104 stores records or file references. Each record is associated with a content subject and may have multiple fields. The fields may contain sentence fragments, phrases, sentences, nouns, and paragraphs. This content data may be selectively used to construct content associated with the content subject.

The content server 106 is coupled to the database 104 and accesses the records associated with the content subjects. Applications such as product profiler 108, proposal builder 110, and e-brochure builder 112 access the content server 106, requesting content associated with a content subject. The content server 106 accesses the database 104 to selectively retrieve requested fields of the record associated with the requested content subject. The content server 106 may provide the content elements in various formats, including a data record set and an XML document.

The applications may construct content using the various formats or models. Some of the fields in the record may, for example, follow a rhetorical model. In this example, the model utilizes sentence elements having a specific grammatical form designed to meet a particular rhetorical or communication function. The sentence elements or grammatical syntax rules may be used to construct a sentence. In one exemplary embodiment, the rhetorical model may be used to form a sentence having three elements, a product name, product class, and product description as shown below.

<<Product name>> is a <<product class>> that <product description>>.

To produce a grammatically correct sentence, the elements follow specific grammatical forms. For example, the product name is a noun, the product class may be a noun that agrees with the singular verb "is" and singular article "a", and the product description may be a phrase beginning with a third-person singular active verb. An example is <<A chair>> is a <<piece of furniture>> that <<has four legs, a platform for sitting, and a back to lean against>>.

Sentence elements may be stored in the database 104. Fields within records associated with content subjects may store grammatical syntax elements that may be used to create sentences based on one or more rhetorical formats. For example, the product name and product class may be used to make a sentence. In another example, the product name field and product description may be used to build another sentence. Alternately, the product name may be used with another element to build a third sentence.

In addition, fields within the record may be used to store phrases, sentences, or paragraphs that fulfill a specified rhetorical/communication function. For example, fields may store teaser sentences, point statements, illustrative descriptions, analogy statements, and feature statements. For example, sentences or phrases may relate to additional differentiators such as differentiating details such as physical or conceptual differences to other products in a class, comparisons with older technologies, examples, inventories, and analogies. In another example, a point statement may be included that further describes the product such as an advantage or usage from the target audience's point of view.

The database may further store contexts in which a content or content element is applicable. For example, content elements relating to the same content subject may be provided for different markets, regions, and branding efforts. In one exemplary embodiment, different legal statements may be provided for use with content based on the region. In another example, different content elements may be provided for marketing to different target markets. In a further example, different content elements such as product names may be associated with a content subject for different branding efforts. Different content elements may be provided for various technical levels as well.

The fields stored within the records may then be queried to selectively retrieve elements that may be utilized to create content. One exemplary application is the product profiler system 108. The content server 106 provides a tagged-segmented data file, such as an extensible markup language (XML) file, including the requested data elements to the product profiler system 108. The product profiler system 108 interprets the tagged-segmented data file to produce content for delivery through a network such as via a web page.

In other exemplary embodiments such as proposal builder 110 or e-brochure builder 112, the content server 106 may provide the content elements as a data record set. The applications 110 and 112 interpret the data record set, selectively utilizing the content elements to develop context-specific content. The content may then be provided in a document, flash file, PDF, or other electronic format.

In one exemplary embodiment, the content management system may be integrated with enterprise architecture. Applications may reside on a user end of the architecture while the content server and database reside in a business services section. In other embodiments, the system may be implemented on an intranet and use browser technology.

In this manner, content elements associated with a content subject may be reused in various contexts or for various purposes. As such, the content elements may be re-purposed and utilized automatically.

Figure 2:
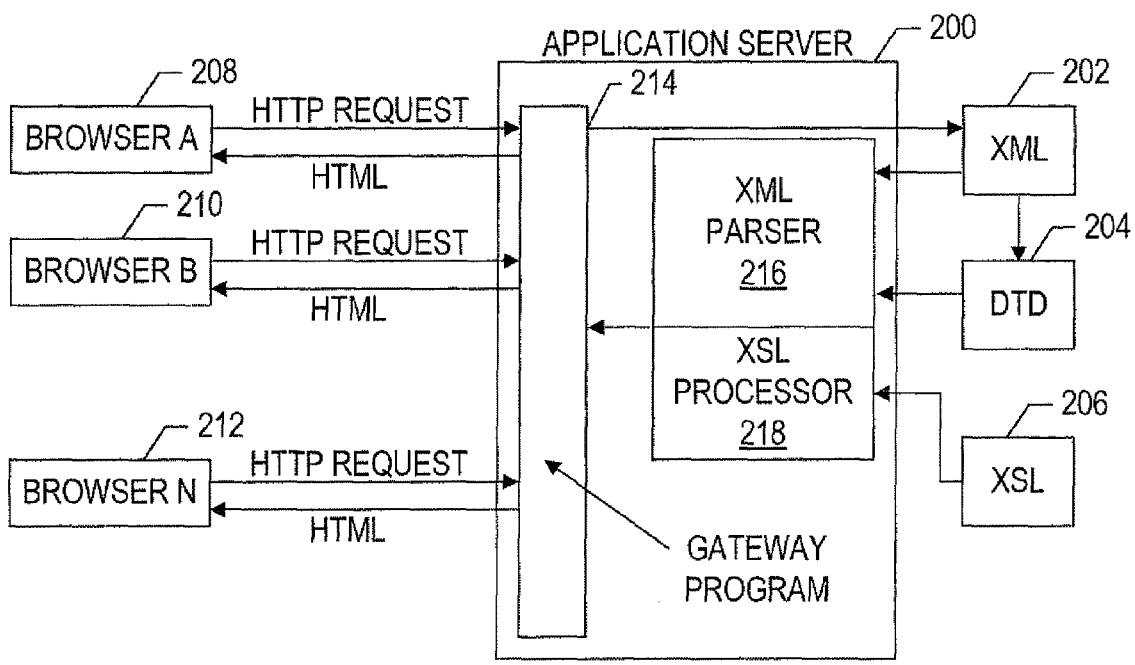
FIG. 2 depicts an exemplary embodiment of a rhetorical content delivery system.

FIG. 2 depicts an exemplary application for creating content. In this exemplary embodiment, a website may be delivered to users. The pages may include content automatically created using the content elements stored in the database. An application server 200 receives requests associated with a content subject from browsers 208, 210 and 212. The application server may have a gateway program 214 that acts to receive the requests and provide the output. In exemplary embodiment, the gateway server 214 receives HTTP requests and provides each HTML web page content.

Upon receiving a request from the gateway program 214, the application server 200 may acquire an extensible markup language (XML) file 202 associated with the requested content subject. The XML may have tags that identify the elements. The XML file 202 may be interpreted by an XML parser 216. The XML file 202 may be associated with a document type definition (DTD) file 204 and further interpreted in accordance with the document type definition (DTD) file 204. The application server 200 may also include an XSL file 206 as interpreted by an XSL processor 218. Together, the XML parser 216 and the XSL processor 218 provide content elements to the gateway program 214. The gateway program 214 assembles the content elements into content included in the web pages.

Each web page may utilize different elements derived from the grammatical syntax fields stored in the database and transferred utilizing the XML file 202. In this manner, the content elements may be utilized in accordance with the intended purpose of the content.

Figure 3:
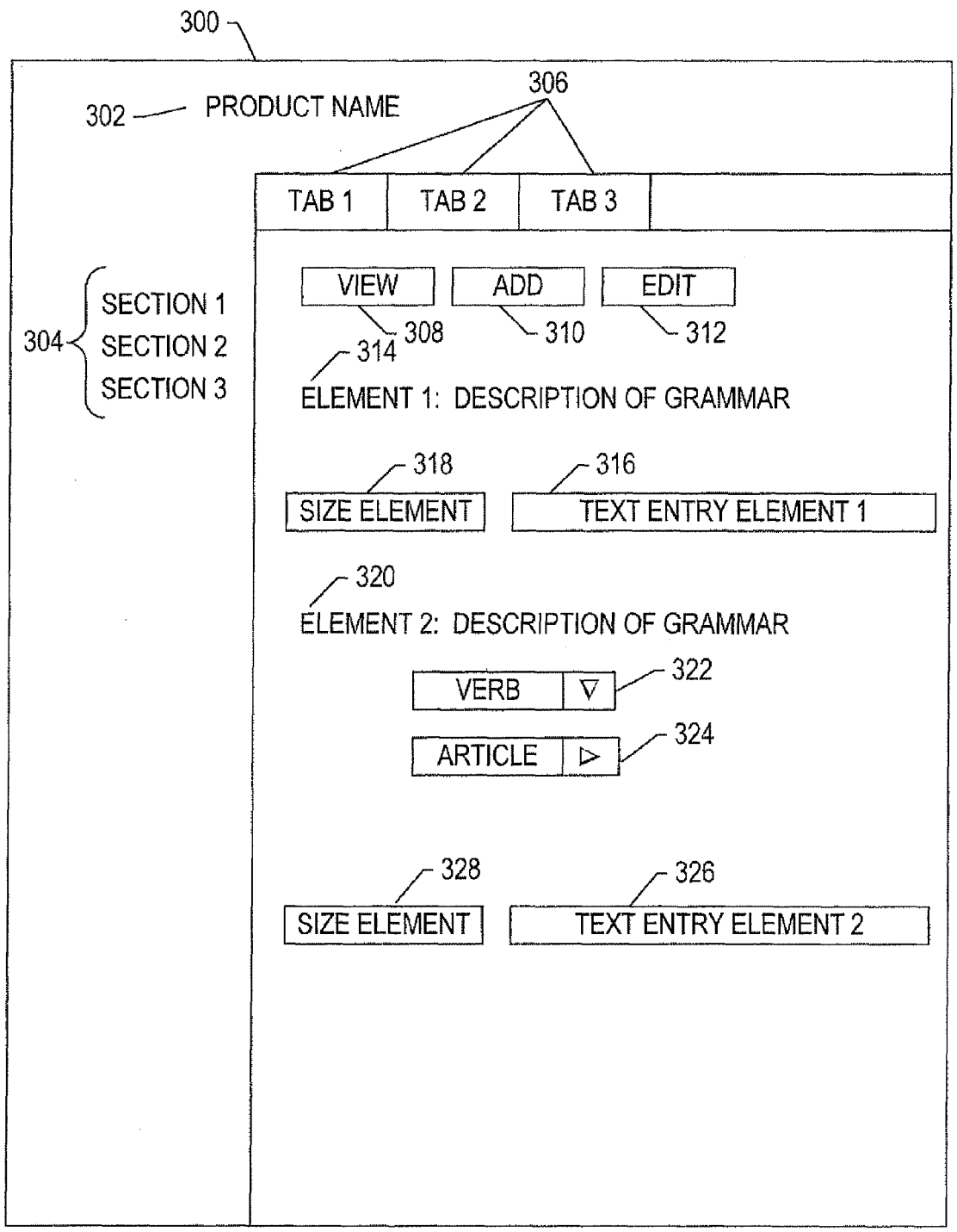
FIG. 3 illustrates an exemplary embodiment of an input tool.

FIG. 3 depicts an exemplary user interface or input tool for entering data into a rhetorical content management database. In this exemplary embodiment, the content subject is a product. The user interface takes the form of a page 300 that includes a product name 302. The page may, for example, be a web page.

Data associated with the product may be subdivided into sections 304, each section having an associated entry page or anchor within the displayed page. The sections may, for example, be subdivisions associated with what a product does, how it works, what it is, general information, branding information, frequently asked questions associated with the product, teasers, product features, advantages, applications, implementation, success stories, components, diagrams, options, availability, legal notices, white papers, and other information.

The interface may be further subdivided into tabbed sections that define certain grammatical structures for a particular content subject, using tabs 306. These tabbed sections may be displayed as individual web pages and each section may have multiple tab pages associated with it. In addition, each page may include an element such as a button. The pages may include buttons such as a view button 308, and add button 310, and an edit button 312. The view button 308 may facilitate a display of content elements associated with the product name 302. The add button 310 may add content entered into the page to the record in the database. The edit button 312 may, for example, unlock text entry fields, permitting editing of text associated with the content elements. Alternately, other buttons may be used to manipulate records within the database.

In this exemplary embodiment, two content elements are shown. Element 314 includes a description of the grammar rules to be applied when entering text. The element 314 may additionally include a text entry form element 316 and a size element 318 that indicates either total size permitted in the text entry element 316, the number of characters remaining for use in the text entry element 316, or the number of characters used in the text entry element 316. For example, element 314 may be a sentence or product tease designed to grab the attention of a potential purchaser. The grammatical and content-guidance rules associated with element 314 may require or suggest that the element be entered as a sentence or a question. The text entry element 316 may, for example, be limited to a size of 250 characters. As the text entry element 316 is used, the number of characters remaining may be displayed in the size element 318.

Element 320 may, for example, be a product classification. The product classification may be used in a rhetorical or classical rhetorical format and require an associated verb, article, and structured phrase or noun. In the exemplary embodiment, a drop-down menu is provided for selecting a verb form that agrees with a controlling grammatical element 322 such as "is" or "are". Another drop-down menu 324 is provided for selecting an article such as "a" or "an". A text entry form element 326 is provided for entering the product class syntax. In addition, a size element box 328 may be provided. For example, in a classic rhetorical format, a sentence may be constructed using the product name 302, the verb selected in menu 322, the article selected in menu 324, and the text in the text entry form element 326. The sentence would read: <<Product name>> is/are a/an <<text entry>>. The verb selected in menu 322, the article selected in menu 324, and the text of text entry element 326 may be stored in a database and reapplied as needed for specific purposes.

Other elements may be entered such as product descriptions, teasers, descriptions of how a system works, success stories, feature names, and point statement sentences. These elements may also have an associated field in the records of the database.

Figure 4:
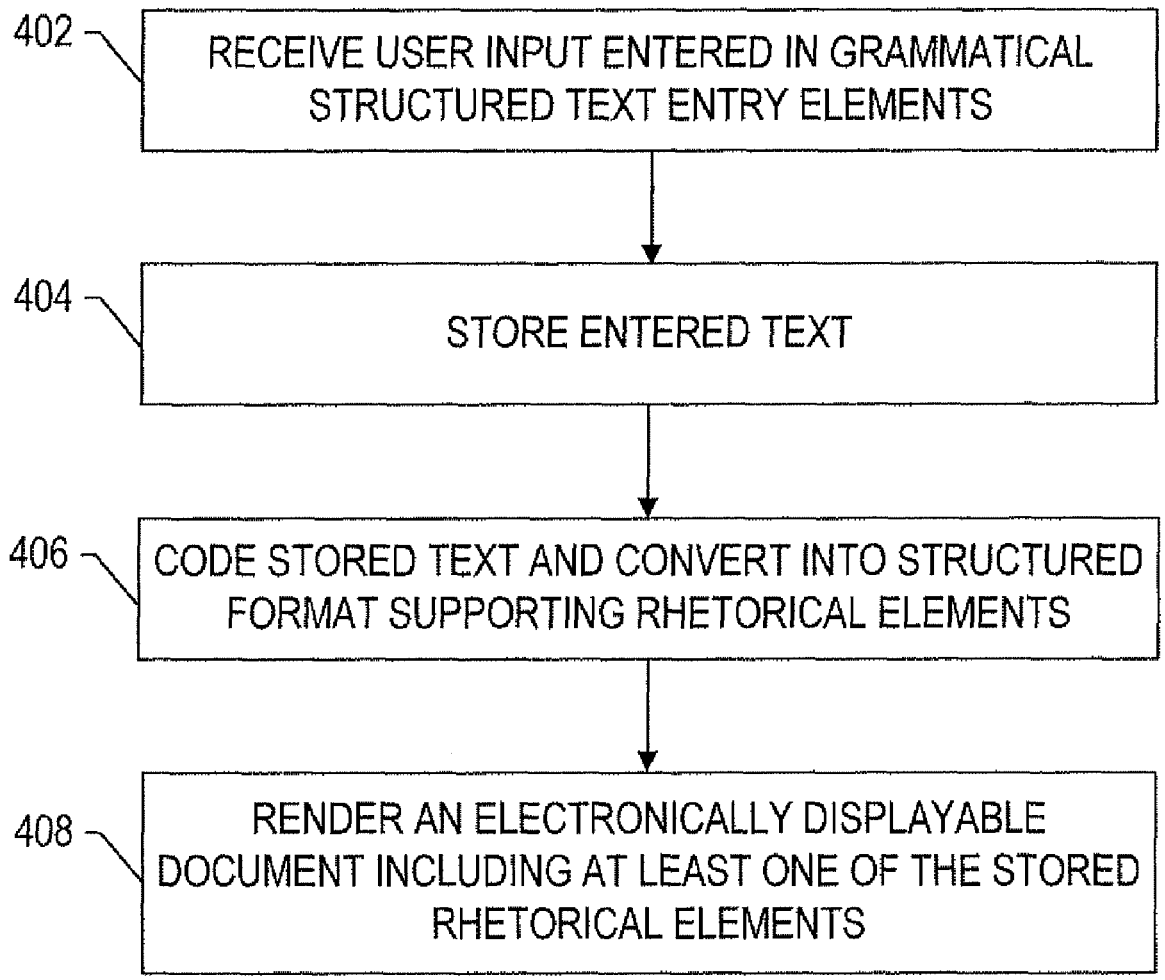
FIG. 4 depicts an exemplary method of content management.

FIG. 4 depicts an exemplary method of content management. The content management system may receive a user input entered in the grammatically structured text entry elements as shown at step 402. The text entered in its grammatically structured format may be stored in the database records as shown at step 404. Some fields may store nouns. Other fields may store phrases starting with a specific verb having a specific tense and number. These fields may be combined according to their associated rhetorical structure to form sentences. Additional fields may store sentences and paragraphs having an associated purpose. The database stores these elements to fulfill rhetorical/communication purposes.

The content management system may then code the stored text and convert it into structured format-supporting rhetorical elements as shown at step 406. For example, the content management system may query the records and create data record sets. In another embodiment, the content management system may query the stored records and formulate tag-structured data files such as XML files for use by other applications. The content management system may then render an electronically displayable document including at least one of the stored rhetorical elements as shown at step 408. For example, the content management system may display a web page utilizing some of the rhetorical data elements. Alternately, the content may be re-purposed and utilized for brochures, proposals, or other documents needing to fulfill a similar rhetorical/communication purpose. The content used in the brochures or proposals may utilize different rhetorical elements from those utilized in providing content for web pages, or in some cases, use the same elements or subsets, depending on the space available and the degree on content needed.

Figure 5:
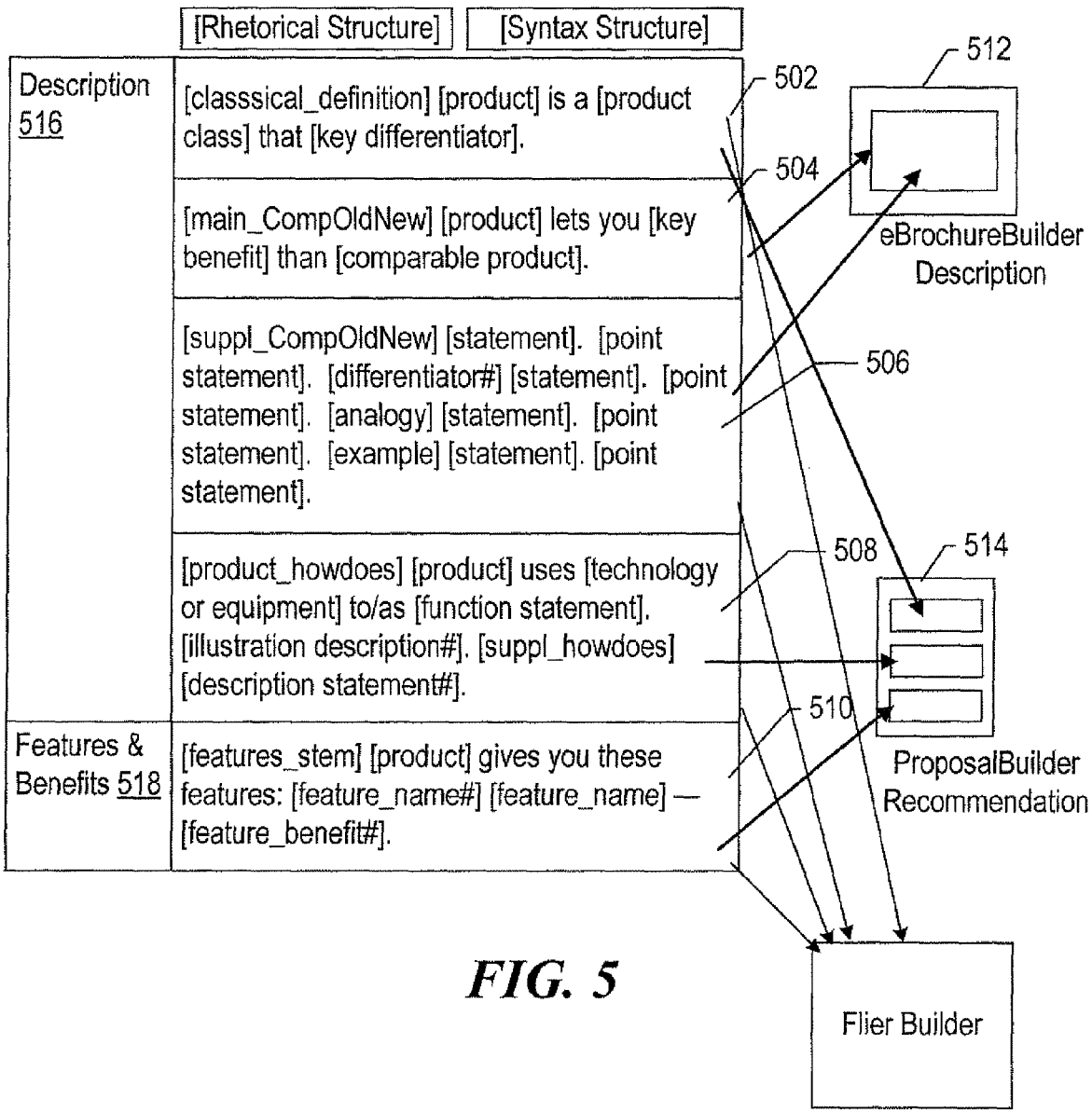
FIG. 5 illustrates an exemplary distribution/repurposing of rhetorically structured content.

FIG. 5 depicts the exemplary use of content data associated with a content subject and its selective use in various applications. The data may be organized into a description 516, features and benefits 518, and other categories. Elements may be stored that can be used in a rhetorical structure to produce content. Each of the elements for use in a rhetorical structure may have a syntax that has the appropriate grammatical format for use in the rhetorical structure. In one exemplary embodiment, a classical rhetorical definition 502 may be used. A sentence structure may be provided such as <<Product name>> is a <<product class>> that has <<a key differentiator>>. A data structure may be provided that stores the product name, the product class, and the key differentiator. The product name, product class and key differentiator may each have a specific grammatical syntax that permits their use in this rhetorical structure, while allowing them to be used together or separately by other grammatical structures that serve similar or even widely different rhetorical/communication purposes in other applications.

Another rhetorical structure, such as the comparison between the old and new as shown in block 504, may also use the product name. The rhetorical structure 504 may utilize a key benefit field and comparable product field that have syntax or grammatical structures different than those of the product class or key differentiator. For example, the key differentiator may have a different format than the key benefit. The different syntax for the comparison old/new is based on the rhetorical function of comparison. The payoff statement may be a benefit. The differing syntax would let a re-user emphasize this benefit over others and add flexibility to the application's discussion of the content.

Other rhetorical structures such as rhetorical structure 506 may utilize sentence syntax structures. Each sentence syntax structure may have a specific purpose. Alternately, such as in how does rhetorical structure 508, a rhetorical structure may be formulated using syntax elements that constitute nouns or phrases as well as syntax structures that include sentences and paragraphs. Syntax structure elements such as the product name may be reused in many rhetorical structures. Other elements may be specific to a given rhetorical structure. Further, these rhetorical structures and the syntax elements may be selectively utilized for different purposes.

An e-brochure may be built utilizing the comparison between the old and new 504 as well as a supplemental comparison between the old and new 506. Alternately, a proposal builder 514 may utilize the classical definition structure 502, the product how does rhetorical structure 508, and the features rhetorical structure 510. In this manner, elements and structures associated with a content subject may be selectively utilized to produce content for differing purposes.

FIG. 6 depicts an exemplary tag-segmented data file 600. The tag-segmented data file may, for example, be an XML file. The XML file may be produced by the content management system from the content stored in the content database. The tag-segmented data file 600 may be used to store a complete data record or partial data associated with a content subject. In the exemplary embodiment of FIG. 6, a product profile is specified. The product profile may have an associated product ID. The data may be further segmented for use in specific markets or regions as indicated by the <Region> tag. <PAC> indicates a specific region and several specific regions may be specified. A tag and tag end are provided for the product name, expanded product name, update date, and update time. These latter two are content management elements. In addition, tags are provided for subdivisions of content elements. For example, a <Description> tag may identify one or more sets of description elements. A description element may for example follow a classical format as indicated by the <Classical_Def> tag. Elements that follow the grammatical format of the classical definition may then be provided as indicated by separate tags. For example, a class description 602, product description 604, and comparison sentence 606 may be provided. The class description and product description may be combined with the product name to form a classical rhetorical sentence. The comparison sentence 606 may be appended to the classical definition to form a paragraph for use in building content.

Additional files such as XSL files may specify how a sentence or content is to be constructed using the content elements of the XML file. The actual output is shown.

Tone Control is a feature of the Liquid Content System that allows a writer to create—and a content user to view—the appropriate information for a variety of audience requirements. For example, Tone Control enables content writers to provide that a general reader and a technical reader receive the appropriate terminology and degree of detail without having to reproduce completely the body of the content they develop. Liquid Content facilitates this benefit by identifying key functional elements within syntax and discourse units which convey the differentiating tonal elements and, providing input models for capturing and re-purposing these tonal elements, and supplying the tonal elements in context to various display applications so that the designer can display and the user can view the content that matches the chosen audience profile.

Because it is driven primarily by the rhetorical functions comprising a given form of communication, Tone Control can also facilitate differentiation of content by other parameters, such as dialect, education level, professional and industry orientation, and even language. Integral to the concept of Tone Control is the audience profile.

The audience profile is a collection of audience factors that describe the viewers for which a given set of content for a product object instance is written and stored in the Liquid Content database. Collectively, these audience factors determine the tone of the content that is written for the concept properties that pertain to that product object type. After selecting a particular product object instance (e.g. Product Offering "Voice Mail for Ohio"), the writer selects an audience profile and tailors the appropriate rhetorical elements with that audience in mind, as described in the previous section. This content is captured in the database as properties of concept types.

Some or all of these audience factors may also have a bearing on how the atomic pieces of content should be assembled and presented as output, such as to accommodate the appropriate syntax order for a language or the degree of detail included for a particular audience. A mechanism for defining output assembly rules can use these audience factors to determine which assembly rules to apply.

Conversely, these audience factors can be used to identify for an appropriate audience a particular set of content that should be presented and allow for combinations of audience types to further meet specific communications requirements. For example, by combining a "language" product concept with a "technical" product object type, a Spanish-speaking person looking for a technical discussion of a product could tailor the content to meet his/her specific needs. The delivery application, such as a web site or an interactive voice response system, may be organized to facilitate the choices the audience would select to provide the content he/she desires.

A set of audience factors are saved as an audience profile, which can be reused for any number of product object instances. Content for more than one audience profile can be written for any given product object instance. Audience factors for which a particular set of content pertains can be included in the audience profile. For example, certain content can apply to either a technical or a general audience.

The examples depicted in FIGS. 7-10 illustrate an XML structure and a resulting document output that facilitates tone control for a product description. The first example illustrated in FIG. 7 and FIG. 9 relates to content for a managerial audience. The second example illustrated in FIGS. 8 and 10 relates to content for a technical audience.

The XSLT layout for each of these examples is shown below:

| Layout in XSLT |
| --- |
| <Teaser_Grabber> <br> <Expanded_Product_Name><Product_Verb><Product_Article> <br> <Class_Description><Product_Relative_Pronoun> <br> <Product_Description> <br> <Comp_Old_New> <br> <Diffs+> <br> <Product_HowDoes><Product_HowDoesExp> |

An example of audience factor categories and available factors is illustrated below:

EXAMPLE

| Audience Factor Category Name | Audience Factor Name |
| --- | --- |
| Customer Classification (i.e. "Vertical Category") | Business <br> Residence |
| Language | English <br> Spanish <br> Italian |
| Sophistication Level | Technical <br> General <br> Beginner |

When considering the applicability of an audience to a particular Audience Profile, the collection of factors are evaluated in the following way:

Because factors in the same Category should be mutually exclusive, they are related by "OR".

The set of factors in different Categories are related by "AND"

For instance:

| | |
| --- | --- |
| Audience Profile #1: (4 Factors) | (Business OR Residence) AND (English) AND (Technical) |
| Audience Profile #2 (3 Factors) | (Residence) AND (Spanish) AND (General) |

Figure 11:
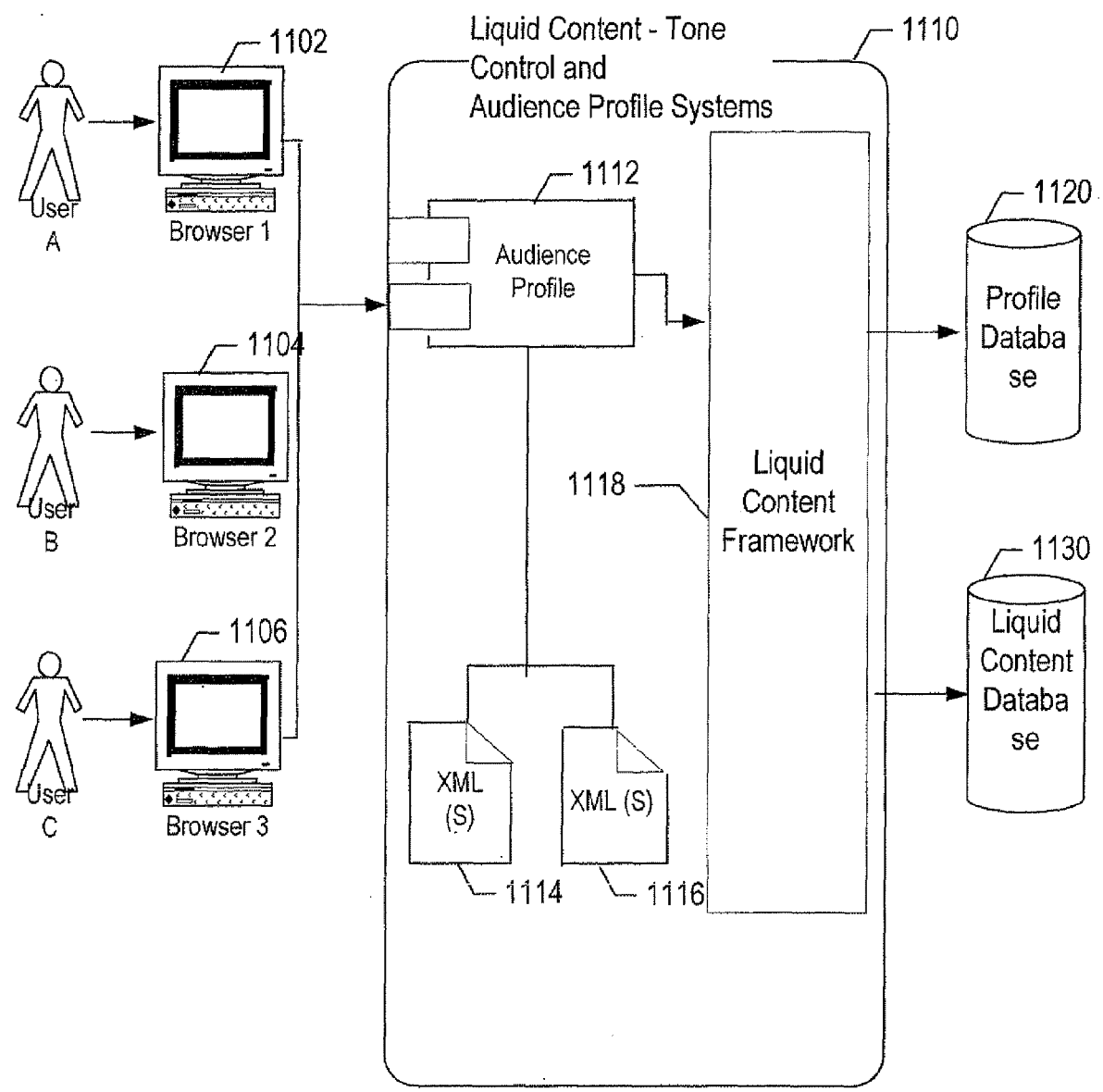
FIG. 11 is a block diagram of a system including a liquid content framework.

Referring to FIG. 11, an illustrative system that includes liquid content with tone control and an audience profile is illustrated. The system includes a liquid content module 1110, a profile database 1120, and a liquid content database 1130. The liquid content module 1110 is responsive to interactive data from a first browser 1102, a second browser 1104, and a representative third browser 1106. Each of the browsers 1102, 1104, 1106 are configured to interact with a respective user, such as a user of an internet or other communication network. The liquid content module 1110 includes a representative audience profile 1112 coupled to a liquid content framework 1118. The audience profile may be implemented as a data structure stored in a computer readable memory. The liquid content framework is coupled to the external database including the profile database 1120 and the liquid content database 1130. The audience profile 1112 is linked to documents or files, such as XML documents 1114 and 1116 as illustrated. The data structure documents such as the illustrated XML documents form the audience profile 1112, which is in turn provided as an input to the liquid content framework 1118. In addition, the audience profile 1112 receives input and may be configured using the browser interfaces, such as browsers 1102, 1104, or 1106.

Figure 12:
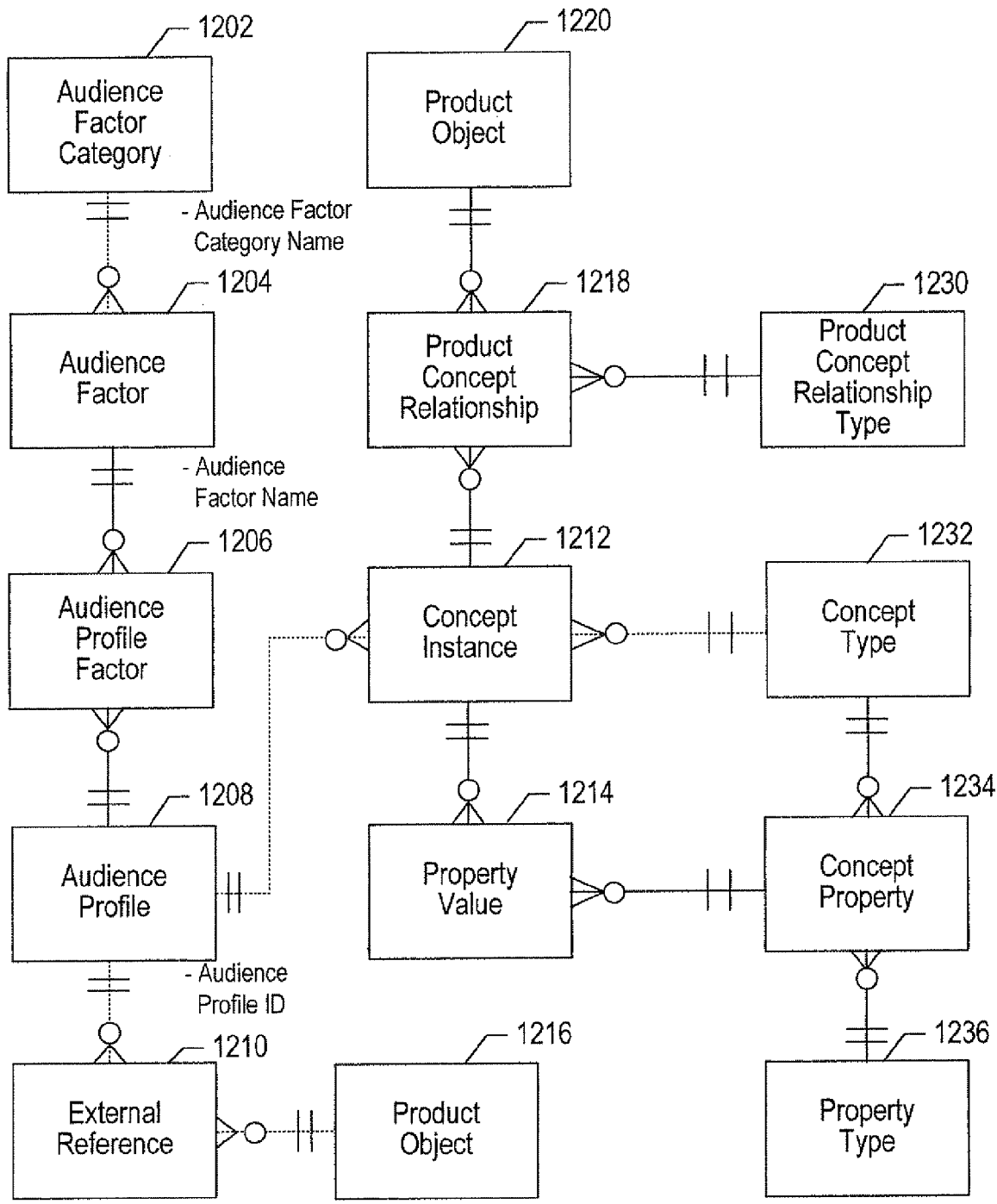
FIG. 12 is a block diagram that illustrates a data structure supporting audience factors.

Referring to FIG. 12, an illustrative data structure for an audience profile with audience factors is shown. The illustrated data structure is constructed to provide the audience profile 1112 for use with a liquid content framework and system. The data structure includes an audience factor category 1202, a represetive audience factor 1204, an audience profile factor 1206, and an audience profile 1208. The audience profile 1208 is linked to an external reference 1210 linked to a product object 1216. The audience profile 1208 is also linked to a concept instance 1212, which has a property value 1214. Property value 1214 is coupled to a concept property 1234 having property type 1236. The concept property 1234 is also linked to concept type 1232. Concept instance 1212 is linked to product concept relationship module 1218 having a product object 1220. The product concept relationship 1218 is linked to a product concept relationship type element 1230. The audience profile structure including audience profile 1208 is formed from various audience profile factors and concept instance structures. In a particular embodiment, a product object, such as product object 1216 provides a generalization role and may contain specific instances of a product object type. The product object type may refer to different physical database objects or different flavors of the same database object. The product object is an individual instance of a product or private offering, and may be a product package or other type of regular product offering.

In a particular illustrative embodiment, a product concept relationship, such as the illustrated product concept relationship 1218 linked to product object 1220 is an instance of a particular product concept relationship type that records an association between a product object instance and a concept instance. The corresponding product object type and concept type are defined by the product concept relationship type. The constraints and other rules regarding cardinality defined and the product concept relationship type may be enforced by an application that is used to populate this entity. A product concept relationship type identifier appears in a primary key since more than one relationship may be defined between the same product object type and concept type.

In a particular embodiment, a concept instance, such as concept instance 1212 identifies specific instances of concept types. Examples types are: feature, differentiator, legal note, need, application, frequently asked question, and success story. In a particular database implementation, a concept instance might be represented by a single table. That table may be represented in a data structure by a concept type. In a particular illustrative embodiment, a property value, such as the illustrated property value 1214 defines a value for a specific property type that may be captured. For instance, for a specific instance of a "benefit name", which is a concept type, the value to be given to a short description field (property type) is a fast data transfer period. The specific attributes to be populated may either be a property value quantity or a property value of text. Whether property value quantity or property value text is selected is determined by a format type code attribute of the corresponding property type instance. Other constraining characteristics for the value are defined in a corresponding concept property instance.

A product concept relationship type, such as the product concept relationship type 1230 may define a prototype for a specific relationship between a product object type and a concept type. In a database implementation, both a product object type and concept type may each be represented by a table. A product object type and a concept type may have a 1-to-many relationship or a 1 to 1 relationship between them, which may be represented on a data model diagram by a relationship link between them and may be implemented by foreign key. A product object type and a concept type may also have a many to many relationship between them, which would be represented on both a data model diagram and a physical implementation by an association table.

The product concept relationship type is a generalization that allows for a definition of any of three different types of relationships between a product object type and a concept type. In defining a product concept relationship type one typically selects the project object type in the concept type instances involved. The determination of whether the relationship is 1-to 1, 1-to-many, or many to many is made using cardinality code values which may be set to a "1" or an "m". A purpose of the abstract database, given a particular product object type as an object of discourse, may be to define atomic pieces of data used to develop descriptive content. A 1-to-1 or 1-to-many relationship toward a product tend to represent classification of information and may appropriately belong in a product catalog database. A concept type, such as the illustrated concept type 1232 of FIG. 12 is a flexible generalization for a concept used to depict detectible descriptive information for products or other similar information where it is desired to define properties with defined values. For example, a concept type value of feature, differentiator, legal note, need, application, frequently asked questions, or success story, may be selected.

A concept property, such as the concept property 1234 associates property types with concept types. In a particular database implementation, a concept type may be represented by a single table. Concept instances would represent individual rows on that table where columns in the table would be described as property types. The table would assign a property type to a concept type. For instance, one might specify that legal notes (a concept type) has a long description (a property type). Characteristics specific to a particular property type within a concept type may also be defined, such as a maximum length for a property type with a text format or whether a particular property type is optional or required.

In a particular embodiment, a property type, such as the property type 1236 is a flexible generalization for a type of property used to describe concepts or concept types where particular values may be assigned. In a particular database implementation, a concept type may be represented by a single table where concept instances would represent individual rows in the table and where columns in the table would be described as the property type.

In a particular embodiment, an external reference, such as the external reference 1210 depicted in FIG. 12 identifies a specific reference instance of a particular external reference type. The external reference type may point to an object or address such as a graphics file or an internet or intranet address. The external reference may be a generalization that provides a common flexible mechanism for organizing various types of references. In a logical data model, an external reference is a sub-type defined by an external reference type code. Bach logical subtype may have a slightly different attribute or column. In a physical data model and database, the logical sub types may be grouped into a super type referred to as the external reference. The logical data model is typically consulted to determine what particular data elements are referenced to other particular elements in the data model. An external reference type provides a means of classifying and grouping external reference instances. The external reference type also defines rules that apply to external reference instances having a particular type.

The audience profile identifies a specific audience type using an audience profile identity (ID). The audience profile is related to one or more concept instances. For example, the illustrated audience profile 1208 is related and linked to the concept instance 1212.

An audience profile factor, such as the audience factor 1206, defines an audience characteristic for a specific relationship between an audience profile and an audience factor. Samples of an audience factor include customer satisfaction level, sophistication level, technical awareness, language, and other attributes, metrics or characteristics of content to be presented to a particular type of audience.

An audience factor category, such as the audience factor category 1202, defines a factor name such as a business or residence for a particular customer classification. Audience factors may be used to provide targeted demographics and for shaping content to a particular audience type within a particular category. A sample data structure that may be constructed to provide for an audience profile for use in connection with a liquid content framework system has been disclosed.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of content management comprising: retrieving a data record associated with a product object instance from a database in response to a first selection of the product object instance; retrieving an audience profile from the database in response to a second selection of the audience profile, the selected audience profile including a plurality of audience factors; converting at least a portion of the data record into a structured format file supporting a plurality of rhetorical elements, wherein the portion of the data record converted into a structured format file is based on the selected audience profile; and rendering an electronically displayable document using the structured format file, the rendering of the electronically displayable document based on assembly rules selected from a plurality of assembly rules, wherein the assembly rules are selected based on the plurality of audience factors of the selected audience profile.

2. The method of claim 1, wherein the structured format file includes XML coding.

3. The method of claim 1, wherein the structured format file includes data record set coding.

4. The method of claim 1, wherein the electronically displayable document is a web page including content customized based on the selected audience profile.

5. The method of claim 1, wherein the electronically displayable document is a proposal including content customized based on the selected audience profile.

6. The method of claim 1, wherein the electronically displayable document is an electronic brochure including content customized based on the selected audience profile.

7. The method of claim 1, wherein the selected audience profile includes a language factor and a level of technical content factor.

8. The method of claim 1, wherein the electronically displayable document is a Portable Document Format (PDF) file including content customized based on the selected audience profile.

9. The method of claim 1, wherein at least one of the plurality of rhetorical elements is associated with a product description.

10. The method of claim 1, wherein the electronically displayable document includes at least one sentence that is constructed by combining a first rhetorical element of the plurality of rhetorical elements with a second rhetorical element of the plurality of rhetorical elements, wherein the first rhetorical element is associated with a classical definition, and wherein the classical definition comprises a product name, a product class, and a product differentiator.

11. The method of claim 10, wherein the second rhetorical element identifies product functionality.

12. The method of claim 1, further comprising receiving input related to the audience profile from one or more browser interfaces.

13. The method of claim 1, further comprising linking the audience profile to a concept instance having a property value.

14. The method of claim 13, wherein the property value is chosen from the group consisting of a feature, a differentiator, a legal note, a need, an application, a frequently asked question, and a success story.

* * * * *